(12) United States Patent
Naidu et al.

(10) Patent No.: US 11,295,151 B2
(45) Date of Patent: Apr. 5, 2022

(54) LINE-BASED FEATURE GENERATION FOR VISION-BASED DRIVER ASSISTANCE SYSTEMS AND METHODS

(71) Applicant: NXP USA, Inc., Austin, TX (US)

(72) Inventors: Sharath Subramanya Naidu, Munich (DE); Ajit Singh, Delhi (IN); Michael Andreas Staudenmaier, Munich (DE); Leonardo Surico, Haar (DE); Stephan Matthias Herrmann, Markt Schwaben (DE)

(73) Assignee: NXP USA, Inc., Austin, TX (US)

( * ) Notice: Subject to any disclaimer, the term of this patent is extended or adjusted under 35 U.S.C. 154(b) by 191 days.

(21) Appl. No.: 16/527,179

(22) Filed: Jul. 31, 2019

(65) Prior Publication Data
US 2021/0034899 A1 Feb. 4, 2021

(51) Int. Cl.
| | | |
|---|---|---|
| G06K 9/00 | (2006.01) | |
| G06K 9/46 | (2006.01) | |
| G06T 1/60 | (2006.01) | |
| B60Q 9/00 | (2006.01) | |
| B60R 1/00 | (2022.01) | |

(52) U.S. Cl.
CPC ..... *G06K 9/00986* (2013.01); *G06K 9/00791* (2013.01); *G06K 9/46* (2013.01); *G06T 1/60* (2013.01); *B60Q 9/00* (2013.01); *B60R 1/00* (2013.01); *B60R 2300/30* (2013.01)

(58) Field of Classification Search
CPC ........ G06K 9/00791; G06K 9/46; G06T 1/60; G06T 2207/30248; B60Q 9/00; B60R 1/00; B60R 2300/30
See application file for complete search history.

(56) References Cited

U.S. PATENT DOCUMENTS

| | | | |
|---|---|---|---|
| 8,744,190 B2 | 6/2014 | Stoeffler et al. | |
| 9,600,737 B2 | 3/2017 | Iwasaki | |
| 10,657,617 B1* | 5/2020 | Wang | G06F 9/544 |
| 2011/0249869 A1 | 10/2011 | Stoeffler et al. | |
| 2017/0004092 A1 | 1/2017 | Haraden et al. | |
| 2017/0132754 A1 | 5/2017 | Mody et al. | |
| 2018/0181816 A1* | 6/2018 | Garud | G06K 9/00973 |
| 2019/0005656 A1* | 1/2019 | Sanghvi | G06T 7/246 |
| 2020/0210351 A1* | 7/2020 | Mody | H04N 9/79 |

\* cited by examiner

*Primary Examiner* — Atiba O Fitzpatrick

(57) ABSTRACT

Embodiments provide line-based feature generation for vision-based driver assistance systems and methods. For one embodiment, a feature generator includes a circular buffer and a processor coupled to an image sensor. The circular buffer receives image data from the image sensor and stores N lines at a time of an image frame captured by the image sensor. The N lines of the image frame are less than all of the lines for the image frame. The processor receives the N lines from the circular buffer and stores one or more features generated from the N lines in a memory. Iterative blocks of N lines of image data are processed to complete processing of the full image frame, and multiple frames can be processed. The generated features are analyzed by a vision processor to identify, classify, and track objects for vision-based driver assistance and related vision-based assistance actions.

9 Claims, 4 Drawing Sheets

LINE-BASED FEATURE GENERATION FOR VISION-BASED DRIVER ASSISTANCE SYSTEMS AND METHODS

TECHNICAL FIELD

This technical field relates to vision-based driver assistance systems.

BACKGROUND

Many vehicles include computer vision-based systems that operate as advanced driver-assistance systems (ADAS). In such compute vision-based applications, the processing flow typically includes the following stages: pre-processing, feature extraction and generation, object detection and classification, and object tracking. The first stage handles pre-processing of data collected by one or more image sensors to make image data usable for later processing stages. These pre-processing functions can be performed in the camera module itself, can be performed outside of the camera module, or can be performed with a combination of functions performed within the camera module and outside the camera module. The feature extraction and generation stage follows the pre-processing stage. The feature extraction and generation stage is a compute intensive stage with well-studied and understood techniques that are commonly used to generate features for image processing and vision-based driver assistance. The generated features are often represented by low-level information extracted from pixels within the image data collected by the images sensors. For example, generated features can be one or more patterns such as edges, corners, statistical information about intensity gradients to form a histogram of oriented gradients (HOG), or other extracted patterns. In the subsequent object detection and classification stage, these generated features are used by one or more processing algorithms to identify and classify objects. For example, algorithms such as convolutional neural network (CNN) algorithms, support-vector machine (SVM) algorithms, other types of decision tree algorithms, or other image processing algorithms can be used for object detection and classification. Further, the last stage can also track objects such that movement of detected objects is tracked over multiple image frames.

In a vision-based ADAS that is embedded within a larger system such as a vehicle, the object detection and classification stage and the object tracking stage are typically executed on vision processors as software driven processing algorithms. The feature extraction and generation stage is typically performed by digital hardware logic circuits. For such a vision-based embedded ADAS, this feature generation is a very important step as the subsequent processing to detect, classify, and track objects is based upon the generated features. Traditional solutions have used frame-based processing of image sensor data to implement the feature generation stage. However, this frame-based feature generation has a significant disadvantage in an embedded ADAS solution due to the large bandwidth and internal memory required to process image frames. These large bandwidth and internal memory requirements are each significant cost factors for overall ADAS solutions.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Embodiments are disclosed that provide line-based feature generation for vision-based driver assistance systems and methods. In part, the disclosed embodiments address problems suffered by prior solutions with respect to feature generation and object detection in vision-based driver assistance systems. By operating on a subset of image lines within a frame for feature generation instead of an entire image frame, the disclosed embodiments reduce system memory and bandwidth requirements thereby reducing overall size and cost for resulting systems. Because this line-based approach is not required to wait until an entire image frame is available, the disclosed embodiments reduce latency in making features available for subsequent object identification, classification, and tracking. This reduced system latency provides a safety advantage in ADAS solutions. A variety of embodiments can be implemented and different features and variations can be implemented while still taking advantage of the line-based feature generation techniques described herein.

Figure 1:
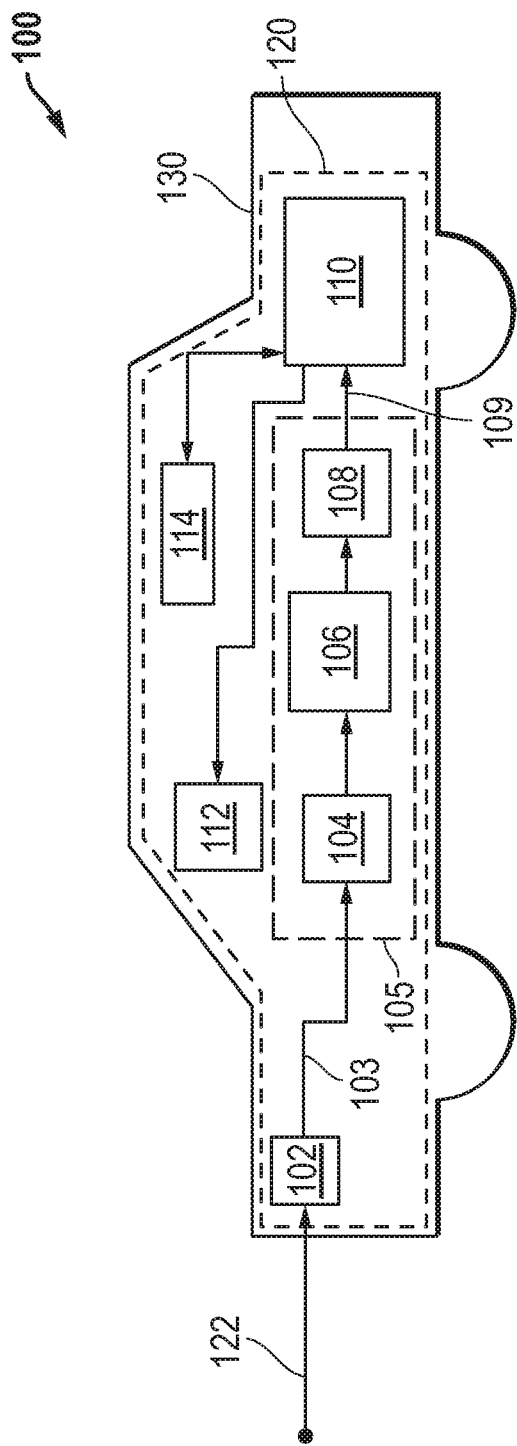
FIG. 1 is a block diagram of an example embodiment for a vehicle including a system that provides vision-based assistance to a driver of the vehicle based upon line-based feature generation.

FIG. 1 is a block diagram of an example embodiment 100 for a vehicle 130 including a system 120 that provides vision-based assistance to a driver of the vehicle 130. The system 120 includes an image sensor 102 that captures an image 122. The image data 103 for the captured image is sent to the feature generator 105. The feature generator 105 includes a circular buffer 104, a processor 106, and a memory 108. For one embodiment, the circular buffer 104 is implemented as a small portion of system memory which is organized as circular buffer. The memory 108 stores one or more features 109 extracted and generated by the feature generator 105 within the image data 103. A vision processor 110 receives the features 109 and identifies one or more objects within the features 109. The vision processor 110 then initiates one or more actions for vision-based assistance to a driver of the vehicle 130. For example, one or more actions can be taken based upon the objects or movement of objects identified within the features 109. These actions can include visual, haptic, audible, or other types of alerts to the driver. For example, haptic and audible actions can include vibrating the steering wheel, vibrating the seat, generating an alarm sound, or other alerts or combination of alerts. These actions can also include direct intervention such as applying an emergency break, adjusting the steering, or other direct intervention or combination of interventions. For one embodiment, one or more vision-based assistance images can be displayed to the driver of the vehicle 130 through a display 112, such as highlighting an area on a heads-up display or rear-view mirror. In addition, one or more user interfaces 114 can also be included within system 120. For one embodiment, the user interface 114 is implemented as part of the display 112, for example, as a touch screen. Further, the feature generator 105 can be implemented as part of a system-on-chip (SoC) integrated circuit. For example, the feature generator 105 and the vision processor 110 can be included within the same SoC integrated circuit, although multiple ICs could also be used. Other variations can also be implemented while still taking advantage of the techniques described herein.

As described herein, disclosed embodiments use the circular buffer 104 to store a few lines of an image frame at a time with respect to the image 122 captured from the image sensor 102. For example, a controller such as controller 304 shown in FIG. 3 or other control circuit can be used to signal the processor 106 when a single line or multiple lines are written to the circular buffer 104. Once a selected number (N) of lines are available in the circular buffer 104, the processor 106 reads the lines in parallel and performs feature generation on a subset of pixels from these lines as described in more detail below with respect to FIG. 2. Feature generation can be implemented using one or more algorithms depending on the feature types being extracted and generated. For one embodiment, these processing algorithms are performed by dedicated hardware logic within a processing pipeline. Generated features 109 are then stored with a memory 108 and output to the vision processor 110 for object detection and classification. For one embodiment, the memory 108 is a dual-data-rate (DDR) dynamic-random-access memory (DRAM).

As further described herein, the circular buffer 104 receives image data 103 from the image sensor 102 and stores only N lines at a time for the image 122 captured by the image sensor 102. The N lines is less than all of the lines within the image frame. For example, the image sensor 102 may be configured to capture images that have H lines and W pixels per line for each captured image frame. The circular buffer 104 may be configured to store only N lines and W pixels per line, where N is less then H. For one example embodiment, H is 2160 lines; N is 10 lines; and W is 3840 pixels. Different values could be used for H, N, and W, while still taking advantage of the line-based techniques described herein.

It is noted that the image sensor 102 can be included within a camera positioned on or within the vehicle 130. In addition, multiple such image sensors and related cameras can also be used for the vehicle 130 to generate image data 103. Further, the vehicle 130 can be any vehicle where vision-based assistance for a driver is desired, such as an automobile, an airplane, a boat, or other type of vehicle. It is further noted that that image data 103 can be provided to the feature generator 105 from another type of image pre-processing component rather than from image sensor 102 or a camera. Further, the vision-based assistance system 120 can also be used in non-vehicle environments where vision-based assistance is needed. Other variations can also be implemented.

Figure 2:
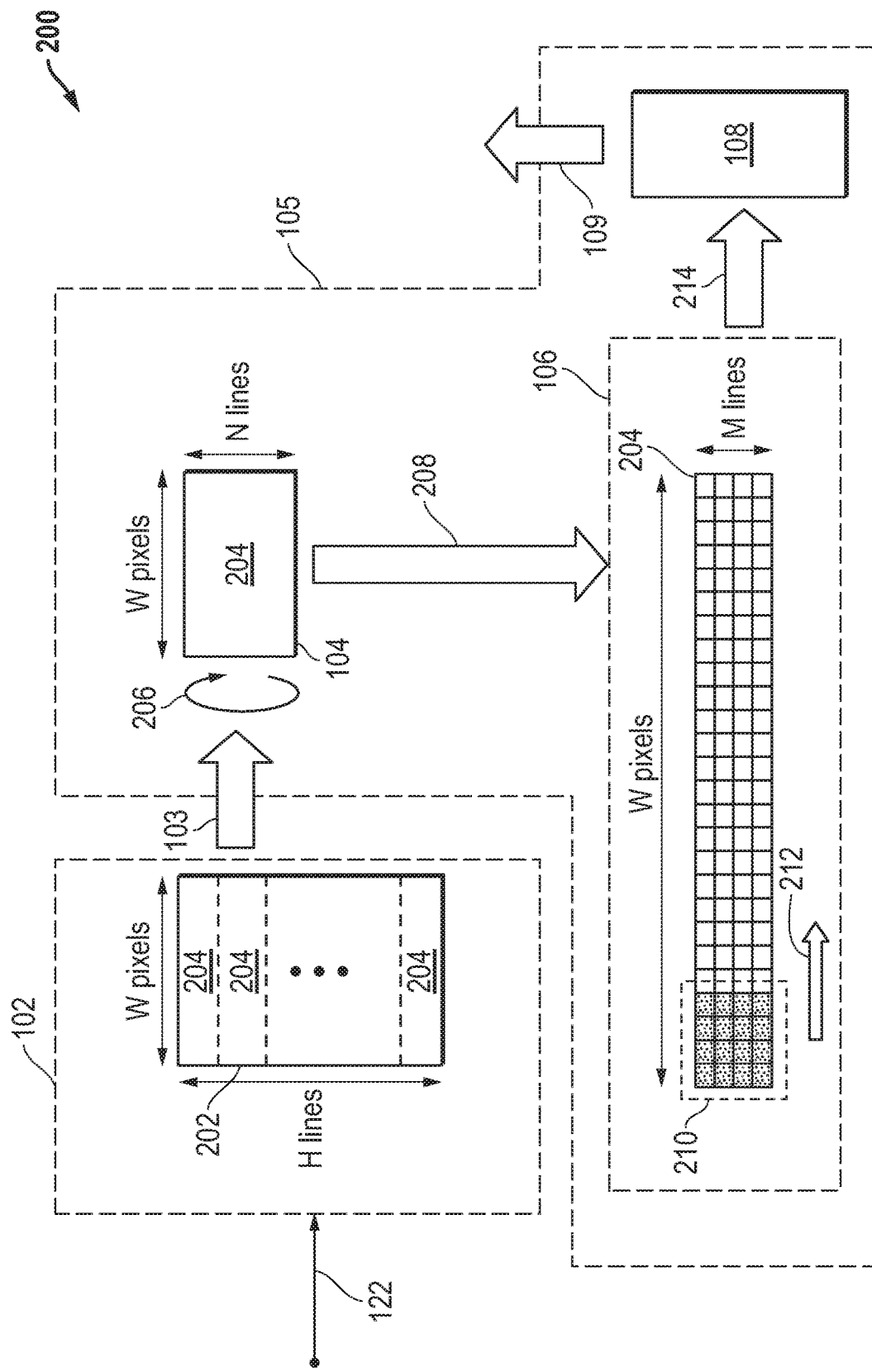
FIG. 2 is a diagram of an example embodiment for processing by a line-based feature generator of an image frame representing an image captured by an image sensor.

FIG. 2 is a diagram of an example embodiment 200 for the processing by the feature generator 105 of an image frame 202 representing the image 122 captured by the image sensor 102. The image frame 202 captured by the image sensor 102 is H lines by W pixels, which represents an W×H pixel resolution for the image frame 202. Image data 103 is then transferred to the circular buffer 104 such that only N lines of the image frame 202 are stored at a time. For one example embodiment, blocks 204 of the full image frame 202 are processed one at a time by the feature generator 105, and each block 204 is N lines by W pixels. As represented by circular arrow 206, data transfers to the circular buffer 104 are repeated so that all of the H lines within the image frame 202 are ultimately processed by the feature generator 105. For a further embodiment, a sliding window is applied so that lines within the image frame 202 are processed multiple times. For example, the size of the circular buffer 104 can be separated into S sub-blocks, and the processing can be initiated each time N/S new lines are added to the circular buffer 104. Where N is 16 lines and S is 4, the processing would be initiated each time 4 new lines were added to the circular buffer. Other variations can also be implemented.

Once a sufficient number (N) of lines are read or transferred such that image block 204 is stored by the circular buffer 104, this block 204 is then accessed and processed by the processor 106, as indicated by arrow 208. For example, when the circular buffer 104 becomes full, the processor 106 can be triggered to read and process the image block 204 stored within the circular buffer 104. As indicated above, each image block 204 is N lines by W pixels, which matches the size of the circular buffer 104. The processor 106 analyzes the image block 204 using one or more algorithms to extract and generate one or more features within the image block 204. For one embodiment, the processor 106 analyzes only a subset 210 of the pixels at a time that are within the image block 204. As indicated by arrow 212, this subset 210 of pixels is shifted by the processor 106 so that all of the pixels within image block 204 are ultimately analyzed. It is noted that the size for the subset 210 of pixels processed at a time can be adjusted based upon one or more parameters including, for example, the size of features being extracted and generated by the processor 106. Further, the pixels within the block 204 can be processed one or more times depending upon the features being extracted and generated.

The feature generation by processor 106 can be implemented using one or more algorithms depending upon the features being extracted and generated for subsequent processing. For example, generated features can be a one or more patterns such as edges, corners, statistical information about intensity gradients to form a histogram of oriented gradients (HOG), or other patterns to be extracted. The generated features are then transferred to and stored within a memory 108 as represented by arrow 214. These generated features 109 are then output by the feature generator 105, for example, to the vision processor 110 shown in FIG. 1.

Figure 3:
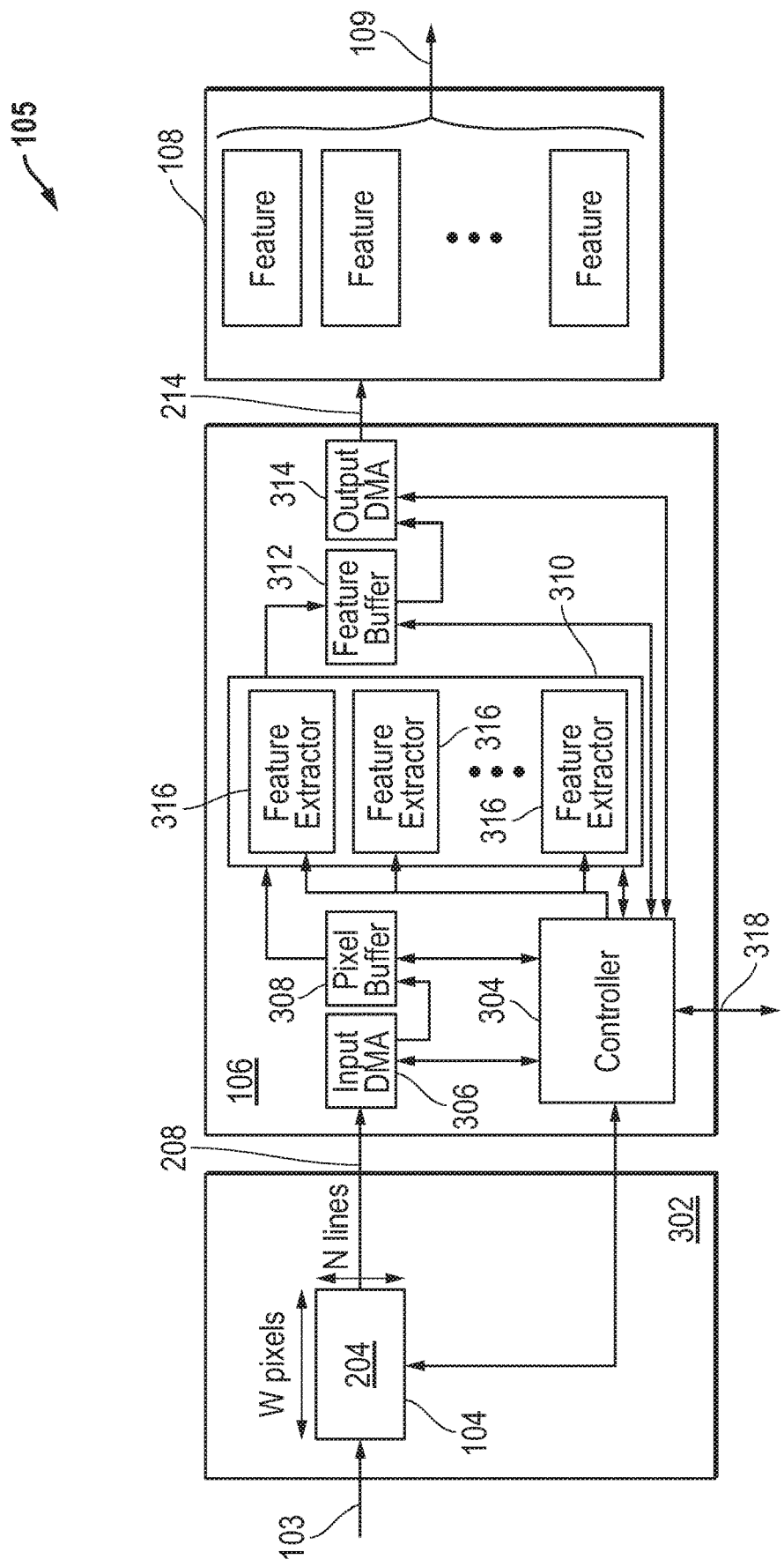
FIG. 3 is a block diagram of an example embodiment where the processor within the feature generator includes a controller and a feature engine with multiple feature generators.

FIG. 3 is a block diagram of an example embodiment where the processor 106 within the feature generator 105 includes a controller 304 and a feature engine 310 with multiple feature extractors 316. As described above, the image data 103 is first stored as line-based data within the circular buffer 104, which can be N lines by W pixels. For the example embodiment of FIG. 3, the circular buffer 104 is implemented as part of a system memory 302. For example, the system memory 302 can be main memory for the system 120 of FIG. 1. The controller 304 determines when the circular buffer 104 is full and triggers transfers of data from the image block 204 stored within the circular buffer 104 to the pixel buffer 308 as represented by arrow 208. For one embodiment, the transfer is implemented through an input direct-memory-access (DMA) transfer as indicated by input DMA 306. The controller 304 then activates one or more of the feature extractors 316 to analyze the image block 204 as it is transferred to the pixel buffer 308. The pixel buffer 308 is provided as a bridge to address access latencies to the circular buffer 104, and data for the image block 204 is streamed through the pixel buffer 308. The number of feature extractors 316 used depends upon the type of feature being extracted. The features generated by the feature extractors 316 are stored within a feature buffer 312. The generated features from the feature buffer 312 are then transferred to the memory 108 as indicated by arrow 214. These generated features are stored as features 109 within the memory 108. For one embodiment, the transfer is implemented through an output direct-memory-access (DMA) transfer as indicated by output DMA 314. These features 109 are subsequently output for further processing to generate vision-based assistance actions. For example, these generated features 109 can be output to and subsequently processed by an vision processor 110 as described with respect to FIG. 1.

The processing of the image block 204 stored within the circular buffer 104 is preferably implemented with streaming data transfers to provide pipelined operation. For this pipelined operation, the input DMA 306, the feature extractors 316, and the output DMA 314 operate in parallel. The input DMA 306 reads data from the circular buffer 104 and provides it to the pixel buffer 308. The feature extractors 316 operate in parallel to process the data within the pixel buffer 308 and generate features that are output to the feature buffer 312. The output DMA 314 operates in parallel to write the generated features to the memory 108. This pipelined operation provides for efficient and faster processing of the image block 204 within the circular buffer 104 by streaming data through the pixel buffer 308 and the feature buffer 312. As such, the pixel buffer 308 and the feature buffer 312 can be reduced size and are not required to store the entire input image block 204 or all of the generated features 109, respectively. During operation, the controller 304 facilitates and controls this pipelined operation through one or more control signals communicated to the input DMA 306, the pixel buffer 308, the feature engine 310, the feature extractors 316, the feature buffer 312, or the output DMA 314.

It is noted that the pixel buffer 308 coupled between the feature engine 310 and the input DMA 306 reduces latency by facilitating the DMA transfers from the circular buffer 104. Similarly, the feature buffer 312 coupled between feature engine 310 and the output DMA 314 reduces latency by facilitating the DMA transfers to the memory 108. The pixel buffer 308 and the feature buffer 312 help with efficient operation in part because DMA accesses typically require a particular block size to be transferred and because feature generation is desired to continue while the DMA operations are working on a transfer (e.g., double buffering). Further, because the memory 108 will typically have unpredictable and variable latency, the additional feature buffer 312 helps to prevent stalling of the pipeline operations.

It is further noted that the feature extractors 316 can be configured to extract and generate a variety of features. Algorithms and processing kernels for this feature generation are preferably implemented using digital hardware logic circuits that are pipelined to generate features such as corners, edges, HOG, transformed color space, or other features. To reduce hardware logic cost, a subset of pixels for an image data block 204 are stored at a time in the pixel buffer 308 and then processed to generate features. For one example embodiment, the pixel buffer 308 stores M lines by W pixels of the image data block 204, wherein M is less then N. In operation, the pixel buffer 308 helps to make the pipelined operation less sensitive to latency variations in accesses to the circular buffer 104. Once a subset of pixels for an image block 204 have been processed, a subsequent subset of pixels from the image block 204 are fetched through the input DMA 306 to replace the current pixels stored in the pixel buffer 308. This process is repeated so that all pixels within the circular buffer 104 are processed. As new image data is loaded into the circular buffer 104, this processing continues so that the entire captured image frame is processed. Generated features are written to a memory 108 through the output DMA 314 and then output from the memory 108 as generated features 109.

Each of the feature extractors 316 can be configured to detect different features within the image data being analyzed. Further, the feature extractors 316 can work in parallel with each other. In addition, the feature extractors 316 can be configured to process outputs from other feature extractors 316. For example, one of the feature extractors 316 can perform a first feature generation step and feed its output data to another of the feature extractors 316 where a second feature generation step is performed. In addition, the controller 304 can cause processing by a subsequent feature extractor 316 to begin after a certain number of lines have been processed by a previous feature extractor 316. Still further, data generated by a first feature extractor 316 can be concatenated before being processed by a subsequent feature extractor 316. The vision processor 110 can also be configured to determine a region of interest (ROI) within the image data being processed. The vision processor 110 can provide information to the controller 304, and controller 304 can control processing such that only lines associated with that ROI are processed by the processor 106 to detect and generate features 109. Further, it is understood that the feature extractors 316 and related control by the controller 304 can be implemented using a wide variety of processing configurations depending upon the features being generated while still taking advantage of the line-based techniques described herein.

It is noted that generated features can also be loaded back into buffer 104 and processed again by a subsequent feature extractor 316. In addition, direct data paths can be provided so that an output from a first feature extractor 316 is provided directly to a second feature extractor 316 for further processing. Other variations could also be implemented.

It is further noted that the controller 304 is configured to implement scheduling logic to control timing events for input transfers 208 and output transfers 214 as pixels for image blocks 204 are processed in iterative subsets with respect to lines stored within the circular buffer 104. This processing is subsequently repeated and iterated over the entire image frame captured and stored by the image sensor 102. To provide control and scheduling, the controller 304 is coupled to provide one or more control signals to the circular buffer 104, the input DMA 306, the pixel buffer 308, the feature engine 310, the feature buffer 312, and the output DMA 314. The controller 304 can also receive one or more return signals from these components as part of this control. In addition, the controller 304 can communicate one or more signals 318 with other circuitry such as the image sensor 102 or the vision processor 110 to facilitate the feature generation and related processing described herein.

For one embodiment, the processor 106 including the controller 304 and the feature engine 310 is implemented using dedicated digital hardware logic circuits or other dedicated digital hardware solutions that implement the control actions and functions described herein. The processor 106 can also be implemented as a microcontroller, a microprocessor, programmable logic device, or other programmable circuit that executes program instructions stored in a non-volatile data storage medium to carry out the control actions and functions described herein. Further, the system memory 302, the pixel buffer 308, the feature buffer 312, and the feature memory 108 can be implemented as one or more data storage mediums configured to store the data described herein. Other variations can also be implemented while still taking advantage of the line-based techniques described herein.

Figure 4:
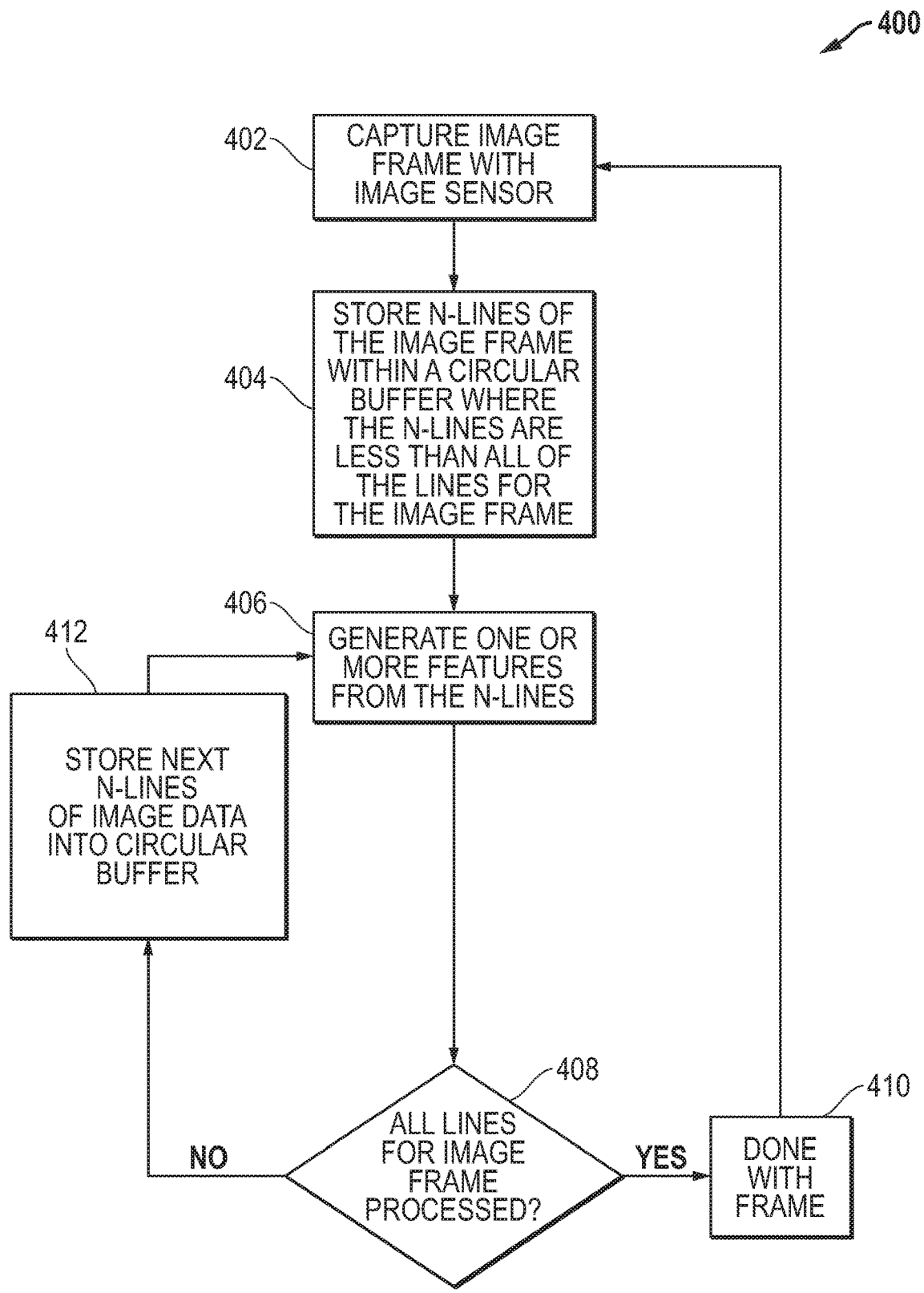
FIG. 4 is a process flow diagram of an example embodiment for line-based feature generation associated with an image captured by an image sensor.

FIG. 4 is a process flow diagram of an example embodiment 400 for line-based feature generation associated with an image 122 captured by an image sensor 102. In block 402, an image frame 202 representing an image 122 is captured by an image sensor 102. In block 404, N lines of the image frame 202 are stored within a circular buffer 104, and the N lines are less than all of the lines for the image frame 202. In block 406, one or more features are generated from the N lines. In block 408, a determination is made whether all of the lines within the image frame 202 have been processed. If the determination is "NO," flow passes to block 412 where the next N lines of image data are stored in the circular buffer 104. Flow then passes back to block 406. If the determination in block 408 is "YES," then the processing of the image frame is done and block 410 is reached. Flow can then pass back to block 402 where a new image frame is captured and processed. It is noted that additional or different process steps can be used while still taking advantage of the line-based feature generation techniques described herein.

As described herein, the vision processor 110 analyzes the generated features 109 within one or more image frames to initiate one or more vision-based actions. As indicated above, these vision-based actions can be haptic, visual, audible, direct intervention, or other actions, and combinations of actions can be taken. The vision processor 110 can analyze the generated features 109 to identify objects using one or more techniques such as support vector machines (SVM) algorithms, decision tree algorithms, neural network algorithms, or other object detection techniques. Typically, this object identification step is conducted frame-wise, and identified objects are often tracked over multiple frames to increase a confidence level that an object in fact exists and has been accurately detected and identified. After object identification with a sufficient confidence level, a vision-based action can be initiated to provide an alert or warning, to cause a direct intervention, or to cause other action to provide vision-based assistance, such as to the driver of the vehicle. For example, actions can include audible warnings, visual warnings. vibrating the steering wheel to warn the driver, triggering an emergency break, triggering a steering change, highlighting areas in a visual display visible to the driver, or another vision-based action. Other variations can also be implemented while still taking advantage of the techniques described herein.

As described herein, a variety of embodiments can be implemented and different features and variations can be implemented, as desired.

For one embodiment, a system is disclosed that includes an image sensor, a feature generator, and a vision processor. The feature generator includes a circular buffer, a processor, a controller for the processor, and a memory. The circular buffer is coupled to receive image data from the image sensor and to store N lines of an image frame at a time where the N lines are less than all of the lines for the image frame. The processor is coupled to receive the N lines from the circular buffer and having one or more features generated from the N lines as an output. The controller is coupled to the circular buffer to cause all lines for the image frame to be received and processed by the processor through the circular buffer. The memory is coupled to store the one or more features from the processor. The vision processor is coupled to receive the one or more features from the memory and has one or more actions for vision-based assistance as an output.

In additional embodiments, the processor includes hardware logic circuits configured to generate the one or more features from the N lines of the image. In further embodiments, the one or more actions include vibrating the steering wheel, vibrating the seat, generating an alarm sound, applying an emergency break, or adjusting the steering. In further embodiments, only a subset of pixels within the circular buffer are processed at a time by the processor.

In additional embodiments, the system includes a pixel buffer coupled between the circular buffer and a feature engine within the processor and a feature buffer coupled between the feature engine and the memory, and the controller is configured to cause data transfers for the pixel buffer and for the feature buffer to occur in parallel to provide pipelined operation. In further embodiments, a direct memory access (DMA) is used for data transfers from the circular buffer to the pixel buffer and from the feature buffer to the memory.

For one embodiment, a circuit to generate features for a vision-based assistance system is disclosed including a circular buffer, a processor, a controller for the processor, and a memory. The circular buffer is coupled to receive image data for an image and to store N lines of an image frame at a time where the N lines are less than all of the lines for the image frame. The processor is coupled to receive the N lines from the circular buffer and has one or more features generated from the N lines as an output. The controller is coupled to the circular buffer to cause all lines for the image frame to be received and processed by the processor through the circular buffer. The memory is coupled to store the one or more features from the processor.

In additional embodiments, the processor includes hardware logic circuits configured to generate the one or more features from the N lines of the image. In further embodiments, the processor further includes a feature engine with a plurality of feature extractors coupled to receive and process the image data.

In additional embodiments, only a subset of pixels within the circular buffer are processed at a time. In further embodiments, the controller is configured to cause data transfers from the circular buffer to occur when the circular buffer is full.

In additional embodiments, the circuit includes a pixel buffer coupled between the circular buffer and a feature engine within the processor and a feature buffer coupled between the feature engine and the memory, and the controller is configured to cause data transfers for the pixel buffer and for the feature buffer to occur in parallel to provide pipelined operation. In further embodiments, a direct memory access (DMA) is used for data transfers from the circular buffer to the pixel buffer and from the feature buffer to the memory.

For one embodiment, a method for vision-based assistance is disclosed including capturing an image frame with an image sensor, storing N lines of the image frame within a circular buffer at a time where the N lines are less than all of the lines for the image frame, generating one or more features from the N lines, storing the one or more features within a memory, and repeating the storing and generating to cause repeated blocks of N lines for the image frame to be processed.

In additional embodiments, the method includes initiating one or more actions for vision-based assistance based upon the one or more features. In further embodiments, the initiating includes vibrating the steering wheel, vibrating the seat, generating an alarm sound, applying an emergency break, or adjusting the steering.

In additional embodiments, the method includes processing only a subset of pixels within the circular buffer at a time. In further embodiments, the method includes causing data transfers from the circular buffer for the detecting when the circular buffer is full.

In additional embodiments, the method includes repeating the capturing, storing, generating, and repeating for a plurality of frames. In further embodiments, the method includes performing the generating of the one or more features and the storing of the one or more features in parallel to provide pipelined operation.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), controllers, microcontrollers, microprocessors, hardware accelerators, ASICs (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system, comprising:
    an image sensor;
    a feature generator, comprising:
        a circular buffer coupled to receive image data from the image sensor and to store N lines of an image frame at a time, the N lines being less than all of the lines for the image frame;
        a processor coupled to receive the N lines from the circular buffer and having one or more features generated from the N lines as an output;
        a controller for the processor coupled to the circular buffer to cause all lines for the image frame to be received and processed by the processor through the circular buffer;
        a memory coupled to store the one or more features from the processor;
        a pixel buffer coupled between the circular buffer and a feature engine within the processor; and
        a feature buffer coupled between the feature engine and the memory, wherein:
            the controller is configured to cause data transfers for the pixel buffer and for the feature buffer to occur in parallel to provide pipelined operation, and
            a direct memory access (DMA) is used for data transfers from the circular buffer to the pixel buffer and from the feature buffer to the memory; and
    a vision processor coupled to receive the one or more features from the memory and having one or more actions for vision-based assistance as an output.

2. The system of claim 1, wherein the processor comprises hardware logic circuits configured to generate the one or more features from the N lines of the image.

3. The system of claim 1, wherein the one or more actions comprises vibrating the steering wheel, vibrating the seat, generating an alarm sound, applying an emergency break, or adjusting the steering.

4. The system of claim 1, wherein only a subset of pixels within the circular buffer are processed at a time by the processor.

5. A circuit to generate features for a vision-based assistance system, comprising:
    a circular buffer coupled to receive image data for an image and to store N lines of an image frame at a time, the N lines being less than all of the lines for the image frame;
    a processor coupled to receive the N lines from the circular buffer and having one or more features generated from the N lines as an output;

a controller (304) for the processor coupled to the circular buffer to cause all lines for the image frame to be received and processed by the processor through the circular buffer; and a memory coupled to store the one or more features from the processor;

a pixel buffer coupled between the circular buffer and a feature engine within the processor; and a feature buffer coupled between the feature engine and the memory, wherein:

the controller is configured to cause data transfers for the pixel buffer and for the feature buffer to occur in parallel to provide pipelined operation, and a direct memory access (DMA) is used for data transfers from the circular buffer to the pixel buffer and from the feature buffer to the memory.

6. The circuit of claim 5, wherein the processor comprises hardware logic circuits configured to generate the one or more features from the N lines of the image.

7. The circuit of claim 5, wherein the processor further comprises a feature engine (310) including a plurality of feature extractors (316) coupled to receive and process the image data.

8. The circuit of claim 5, wherein only a subset of pixels within the circular buffer are processed at a time.

9. The circuit of claim 5, wherein the controller is configured to cause data transfers from the circular buffer to occur when the circular buffer is full.

* * * * *